United States Patent [19]

Klose et al.

[11] Patent Number: 5,118,269
[45] Date of Patent: Jun. 2, 1992

[54] MOLD CLAMPS FOR A VULCANIZATION PRESS

[75] Inventors: Karl W. Klose; Devon D. Lease, both of Findlay, Ohio

[73] Assignee: Cooper Tire & Rubber Company, Findlay, Ohio

[21] Appl. No.: 597,969

[22] Filed: Oct. 9, 1990

[51] Int. Cl.⁵ .................. B29C 43/32; B29C 45/17; B29C 35/00
[52] U.S. Cl. .................. 425/47; 72/481; 100/918; 269/309; 425/195
[58] Field of Search .................. 269/309; 72/481; 100/918; 425/195, 193, 28.1, 47

[56] References Cited

U.S. PATENT DOCUMENTS

| | | | |
|---|---|---|---|
| 2,913,946 | 11/1959 | Ellrich | 100/918 |
| 3,422,661 | 1/1969 | Blackhurst | 100/918 |
| 3,427,854 | 2/1969 | Michelson | 100/918 |
| 3,427,855 | 2/1969 | Michelson | 100/918 |
| 4,129,406 | 12/1978 | Capecchi | 425/46 |
| 4,883,415 | 11/1989 | Salvadori | 425/47 |
| 4,955,799 | 9/1990 | Katayama et al. | 425/47 |

FOREIGN PATENT DOCUMENTS

| | | | |
|---|---|---|---|
| 3331676 | 3/1985 | Fed. Rep. of Germany | 100/918 |
| 0248318 | 8/1987 | German Democratic Rep. | 100/918 |
| 0050732 | 5/1981 | Japan | 72/481 |
| 0542581 | 1/1977 | U.S.S.R. | 72/481 |
| 87/02306 | 4/1987 | World Int. Prop. O. | 425/195 |

*Primary Examiner*—Willard E. Hoag
*Attorney, Agent, or Firm*—Joseph G. Nauman

[57] ABSTRACT

The present invention provides a clamp assembly for use in combination with a vulcanization press for curing tires wherein the press includes a frame for supporting upper and lower platens carrying upper and lower cooperating mold halves. The platens are movable toward and away from each other such that the mold halves may be moved toward a closed mating position and an open tire receiving position. The clamp assemblies of the present invention hold the mold halves onto their respective platens and include an elongated clamp body which is mounted to the press frame adjacent to a platen and a sliding wedge member which is guided for movement toward and away from the platen along the clamp body. The mold halves are each provided with a wedge-shaped clamp ring and pneumatic cylinders are provided for moving the sliding wedge member forward to engage the clamp rings and thereby hold the mold halves in place on the platens.

11 Claims, 5 Drawing Sheets

MOLD CLAMPS FOR A VULCANIZATION PRESS

BACKGROUND OF THE INVENTION

The present invention relates to press apparatus and, more particularly, to a clamping apparatus for holding molds within a press such as may be used for vulcanizing tires.

One type of press commonly used for vulcanizing tires includes an upper and lower platen having opposing faces and a pair of mold halves wherein each mold half includes a base mounted to the face of a respective platen. The platens are movable toward and away from each other such that the mold halves may assume an open position to receive an uncured or green tire and a closed position for vulcanizing the tire within the press. The necessary heat for vulcanizing the tire is usually provided by the platens which are heated through a circulating steam source wherein heat is transferred from the face of each platen to the base of a respective mold half. In addition, steam is used to heat a diaphragm located inside the uncured tire thereby to increase the internal tire temperature as well as provide controlled pressure to press the uncured tire into the mold halves such that the uncured tire is transformed into the final appearance characteristics of the tire as defined by the design pattern formed in the inside surfaces of the mold halves.

Those skilled in the art will be aware that other methods of heating tire vulcanizing molds are available. For example, the platens may be heated electrically rather than with steam or the molds may be heated directly by placing them in a heated pressure chamber such as is done by steam dome press. Alternatively, the molds may be designed with hollowed out cavities for receiving steam whereby the mold may be heated directly by the steam such as is provided by jacketed mold presses.

For the purpose of simplifying the present discussion and disclosing the novelty and advantages of the present invention, reference will be made in the following descriptive portions to a press having platens which are formed as the mold heating means and in which means are provided for clamping the mold halves to the platens. However, it should be understood that other methods of heating molds currently being used in the tire industry are equally applicable to the present invention.

When it becomes necessary to remove a mold from the press, either for the purpose of repairing the mold or to replace it with another mold, the mold halves are first moved to their mating or closed position and a plurality of bolts holding each mold half to its respective platen must then be removed. The upper platen is then raised away from the mold halves and the mold halves may then be removed from the press by a lifting device such as a forklift and taken away for repair, cleaning or for storage.

The above procedure has proven to be difficult, time consuming and dangerous since a typical mold change operation is often performed upon a pair of molds that have just completed their production run and which may be at temperatures approaching 400° F. Further, the installation of replacement molds is also a difficult operation in that the bolt holes on the molds must be accurately aligned with the holes in the platens, or an equivalent support structure on the press, before the bolts may be installed to fasten the molds to the press. The difficulty of this operation is increased by the extreme weight of the molds which prevents the molds from being easily manipulated into proper alignment with the press platens and usually requires the use of additional equipment such as hydraulic jacks, chains and wedges.

Thus, there is a need for providing means by which mold halves may be quickly removed from their respective supporting structures on the press. In addition, there is a need for means which facilitate positioning and clamping of replacement molds to a press without requiring plant personnel to move in and about the press structure which is usually hot.

SUMMARY OF THE INVENTION

The present invention provides a clamp for use in combination with a vulcanization press for curing tires wherein the press includes a frame for supporting upper and lower patens carrying upper and lower cooperating mold halves. The platens are movable toward and away from each other such that the mold halves may be moved toward a closed mating position and an open tire receiving position.

The mold halves are held onto their respective platens by means of clamp assemblies mounted to the press frame. Each clamp assembly includes a clamp body having an elongated slide guide for guiding a camp slide member toward and away from a clamping position with a mold half.

A clamp ring is mounted to the periphery of each mold half and cooperates with the clamp slide member of the clamp assemblies to hold the mold half on its respective platen. The clamp slide members and the clamp rings are provided with cooperating wedge surfaces such that as the clamp slide members are moved toward their clamping position, the wedge surfaces cooperate with each other whereby each of the mold halves are initially centered relative to their respective platens, and are subsequently firmly clamped in place on the platens.

Each of the slide members is biased toward and away from its clamping position by means of a pair of pneumatic cylinders which are mounted between the clamp body and the slide member. In addition, the slide members are held in their clamping position by means of a pawl extending from a pivotally mounted bar attached to the clamp body. The pawl engages a rearward surface of the slide member to prevent it from moving rearwardly toward an unclamped position, and the pawl is biased toward its locking position such that it automatically moves into locking position once the slide member is in its final clamping position.

A cylinder actuated plunger is located above the pawl member when the slide member is in its clamping position such that upon actuation of the plunger cylinder the plunger moves the pawl downwardly out of contact with the rear surface of the slide member, thereby allowing the pneumatic cylinders to move the slide member rearwardly away from the clamping position.

Other objects and advantages of the invention will be apparent from the following description, the accompanying drawings and the appended claims.

DETAILED DESCRIPTION OF THE PREFERRED EMBODIMENT

Figure 1:
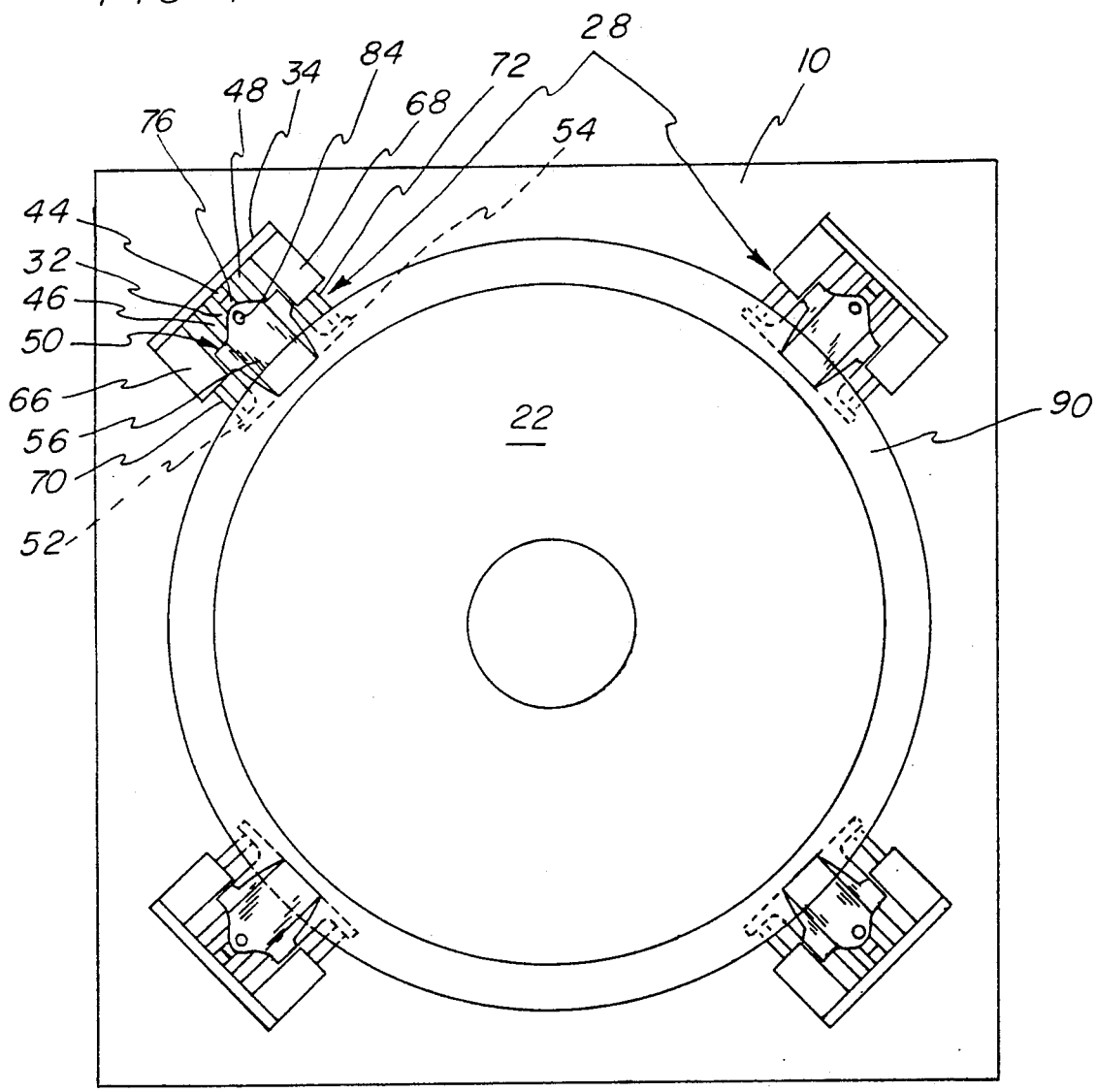
FIG. 1 is a plan view of the clamping assemblies of the present invention clamping a mold half on a press frame.
Figure 2:
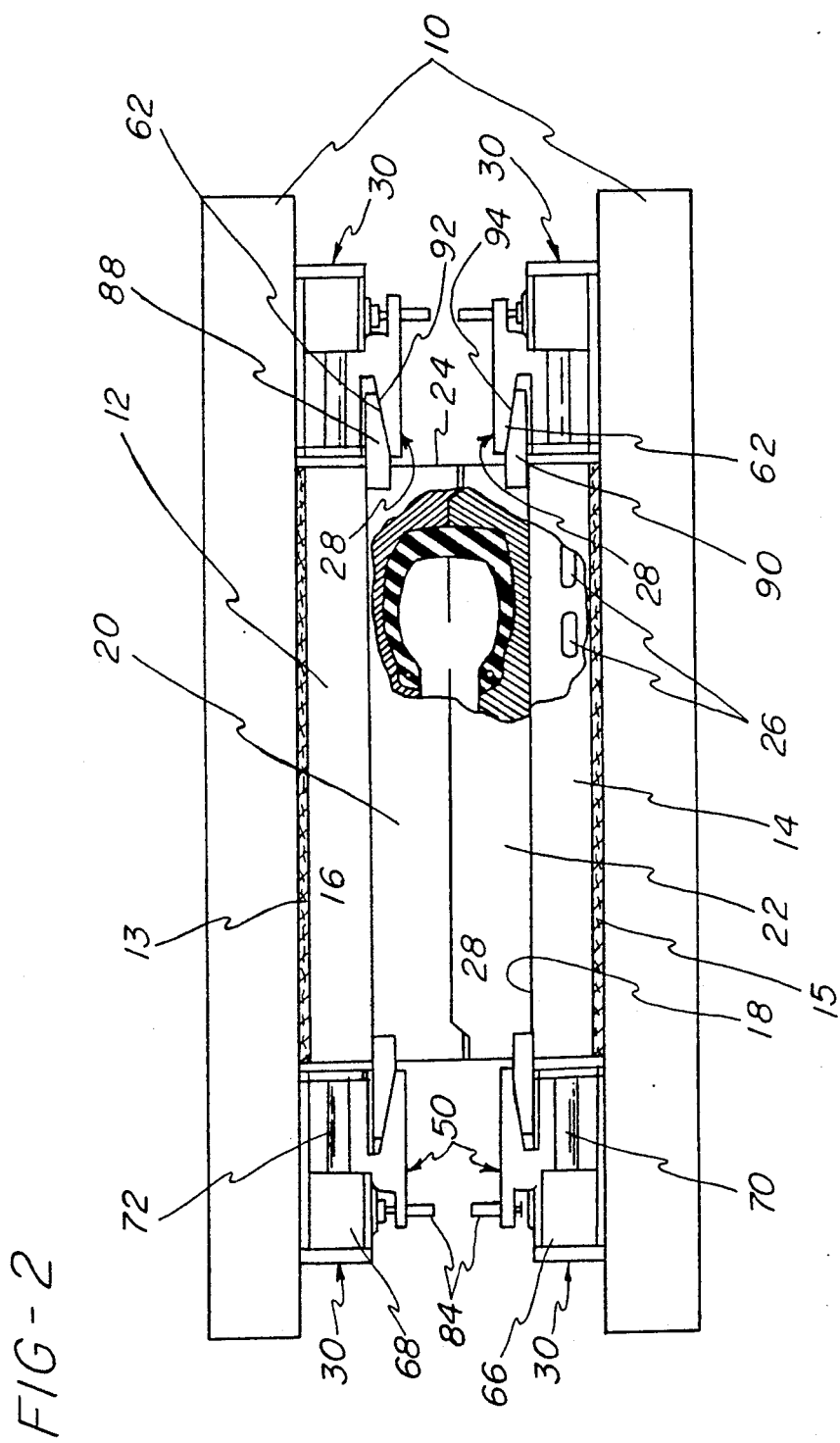
FIG. 2 is a side view in partial cross-section showing the clamping assemblies of the present invention in place on a press frame.

The clamp assembly of the present invention is designed to be used in combination with a vulcanization press for curing tires, such as is shown in FIGS. 1 and 2. The press may include a press frame 10 to which is mounted an upper platen 12 and a lower platen 14 for movement toward and away from each other, and insulating layers 13, 15 may be provided between the upper and lower platens 12, 14, respectively, and the press frame 10 to limit heat transfer from the platens 12, 14 to the press frame 10. Each of the platens 12 and 14 includes a planar face 16 and 18, respectively. An upper mold half 20 is attached to the upper platen face 16 and a lower mold half 22 is attached to the lower platen face 18. The upper and lower mod halves 20, 22 form mating sections for receiving a tire carcass 24 to be vulcanized within the press. The platens 12, 14 may be provided with passageways 26 such that a heating fluid such as steam may be supplied to heat the platen and thereby heat the mold sections 20, 22 for vulcanizing the tire 24.

The mold halves 20, 22 are held to their respective platens 12, 14 by means of clamp assemblies 28. In the preferred embodiment, each mold half 20, 22 is provided with two or more clamp assemblies 28 which are preferably spaced equally around the periphery of the mold half.

Figure 3:
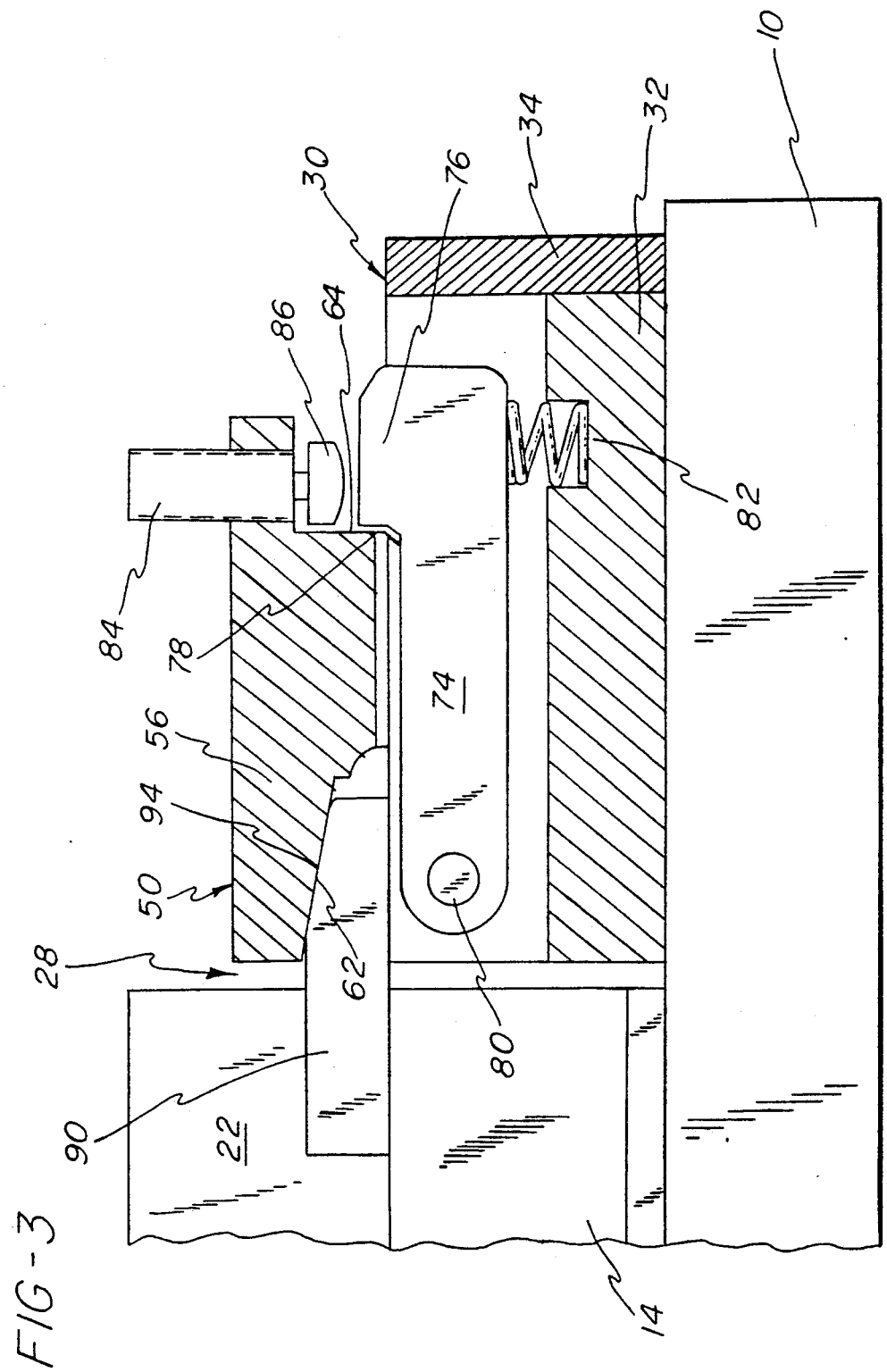
FIG. 3 is an elevational side view showing a cross-section of the clamp assembly of the present invention.
Figure 4:
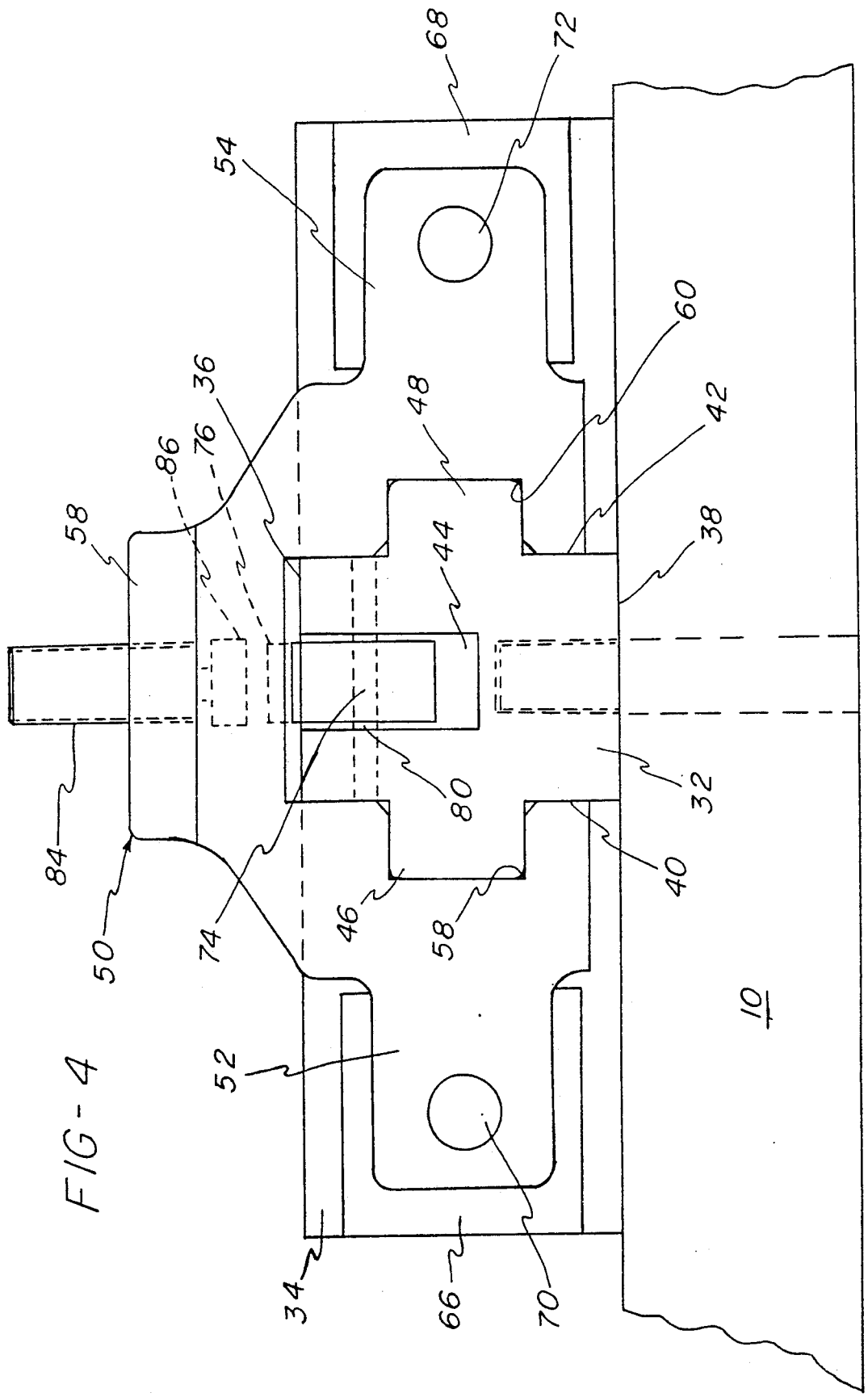
FIG. 4 is an elevational end view of the clamp assembly of the present invention taken from the end adjacent to the mold half.
Figure 5:
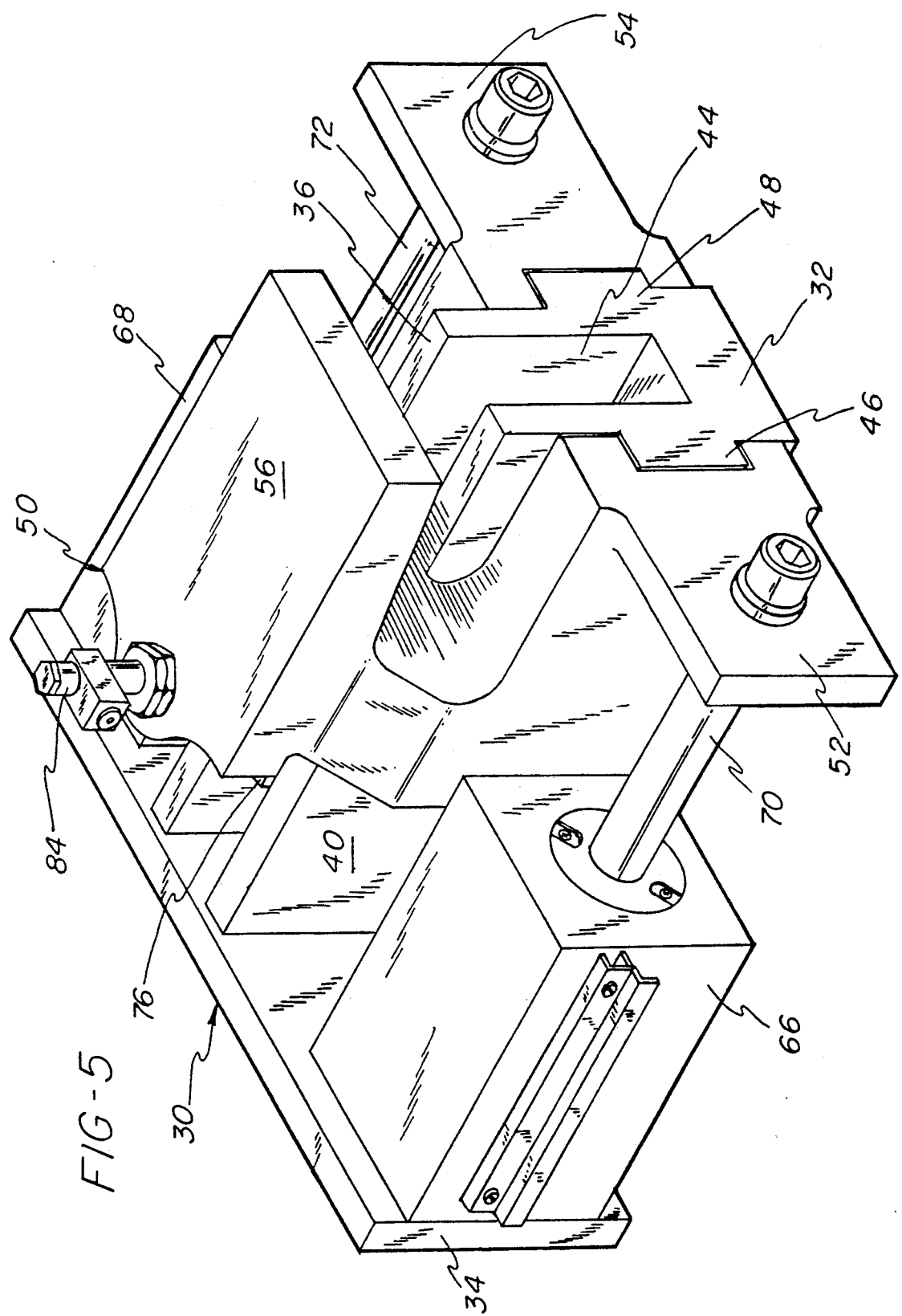
FIG. 5 is a perspective view of the clamp assembly in its extended or clamping position.

As may be seen with reference to FIGS. 3, 4 and 5, the clamp assemblies 28 include a clamp body 30 having an elongated slide guide member 32 and a cylinder support plate 34 attached to an end of the slide guide 32.

The elongated slide guide 32 is formed having a generally T-shaped cross-section and includes a top surface 36, a bottom surface 38 and opposing sides 40, 42. An elongated slot 44 extends into the clamp body 30 from the top surface 36 thereof and substantially rectangular guide rails 46, 48 extend laterally from each of the opposing sides 40, 42 in spaced relation to the top and bottom surfaces 36, 38 along the length of the slide guide 32.

A clamp slide member 50 is provided for sliding longitudinally along the upper portion of the clamp body 30. As may be seen in FIGS. 4 and 5, the clamp slide 50 includes a pair of laterally extending wing portions 52, 54 and a centrally located clamping plate 56 extending between the wing portions 52 and 54 and over the top surface 36 of the slide guide 32. The wing portions 52, 54 extend over the opposing sides 40, 42 in spaced relation to the bottom surface 38 of the slide guide 32, and each wing portion 52, 54 includes a slot 58, 60 for receiving one of the guide rails 46, 48 therein. The wing portion slots 58, 60 and guide rails 46, 48 cooperate with each other to support and guide the slide member 50 in its longitudinal movement along the slide guide 32.

Referring to FIG. 3, it may be seen that the clamp plate 56 includes a cam or wedge surface 62 formed in a front portion thereof and which extends inwardly toward the clamp body 30 from the front portion to the rear portion of the clamp plate 56. The slide member 50 further includes a lower lip portion 64 located at the rear of the slide member 50 and extending toward the clamp body 30 substantially perpendicular to the clamp plate 56. The lower lip portion 64 defines a rearwardly facing locking surface the purpose of which is described further below.

Referring now to FIG. 1, it may be seen that the clamp assembly 28 further includes a pair of cylinders 66, 68 which are preferably pneumatically actuated and which are attached to laterally extending portions of the cylinder support plate 34 to either side of the slide guide 32. Each clamping cylinder 66, 68 includes a cylinder piston 70, 72 which is connected to respective wing portions 52, 54 whereby activation of the cylinders 66, 68 in a first direction causes the clamp slide 50 to move to a forward position along the clamp slide 32, as may be best seen in FIGS. 2 and 3, and actuation of the cylinders 66, 68 in a second direction causes the clamp slide 50 to move to a rearward release position.

As may be seen in FIG. 3, a locking bar 74 is positioned within the slot 44 in the slide guide 32 and includes a pawl portion 76 extending from the locking bar 74 toward the outer portion of the slot 44. The pawl portion 76 defines a forwardly facing pawl surface 78 extending substantially perpendicular to the longitudinal direction of movement of the slide member 50. The locking bar 74 is pivotally mounted within the slide guide slot 44 by pin means 80 located at a forward portion of the slide guide 32 whereby the pawl portion 76 may be pivoted into and out of a rearward portion of the slot 44. Further, a spring 82 is located between the locking bar 74 and a bottom portion of the slot 44 for biasing the pawl portion 76 upwardly out of the slot 44.

The pawl portion 76 is located such that the pawl surface 78 may be positioned behind the locking surface 64 of the slide member 50 when the slide member 50 is located at its forwardmost position by the pneumatic cylinders 66, 68. Thus, when the slide member 50 is in its forwardmost position, the locking bar 74 will be pivoted upwardly by the biasing spring 82 such that the pawl surface 78 will be directly adjacent to the locking surface 64 whereby the pawl and locking surfaces 78 and 64 may contact each other and prevent rearward movement of the clamp slide member 50. In this manner, the clamp slide member 50 may be locked in its forwardmost or clamping position.

As may be seen in FIG. 3, the clamp slide member 50 is further provided with a pneumatic cylinder 84 mounted to and extending through a rearward portion of the clamp plate 56. The cylinder 84 includes a plunger member 86 which is spring biased upwardly toward the clamp plate 56 and which is positioned directly above the pawl portion 76 of the locking bar 74 when the clamp slide member 50 is in its forwardmost position Thus, the pawl member 76 may be disengaged from the lower lip locking portion 64 of the sliding member 50 by activating the cylinder 84 to extend the plunger 86 toward the pawl portion 76, thereby displacing the pawl portion 76 downwardly into the slot 44 such that the slide member 50 may then be moved rearwardly by the pneumatic cylinders 66, 68.

The clamping assembly further includes a clamping bar or ring 88, 90 attached to respective upper and lower mold halves 12, 14. The clamp bars 88, 90 each include wedge surfaces 92, 94 extending outwardly from the mold halves and downwardly toward the base of the respective mold halves 12, 14 at approximately the same angle as the angle of inclination of the wedge surface 62 on the slide member 50.

In operation, a set of two or more clamping assemblies 28 are attached to an upper portion of the press frame 10 and another set of two or more clamping assemblies 28 are attached to a lower portion of the press frame 10. The clamping assemblies 28 of each set are preferably equally spaced about the location of an associated platen 12, 14 for receiving a mold half 20, 22. When the mold halves 20, 22 are positioned on their respective platens 12, 14, the clamp rings 88, 90 extend over a front portion of the clamp slide guide 32 of an associated set of clamp assemblies 28, as may be clearly seen in FIG. 3. During the positioning of the mold halves 20, 22 on their respective platens 12, 14, the slide member 50 is located at its rearwardmost position along the slide guide 32 and, subsequent to positioning of the mold halves 20, 22 on the platens 12, 14, the pneumatic cylinders 66, 68 of each clamp assembly 28 are simultaneously activated to force the slide member 50 forward As the slide members 50 move forwardly toward the clamp rings 88, 90, the wedge surfaces 62 of the slide members 50 engage the wedge surfaces 92, 94 of the clamp rings 88, 90. Subsequent to the initial engagement with the mod halves, the wedge surfaces 62 further engage the wedge surfaces 92, 94 to firmly clamp the mold halves 20, 22 downwardly toward their respective platens 12, 14 and the lock bar 74 and pawl portion 76 of each clamp assembly 28 pivots upwardly to position the pawl surface 78 opposite from the locking surface 64 whereby the slide member 50 is prevented from moving away from an associated mold half and the mold halves 20, 22 are safely locked into a clamped position within the press. Thus, in the event of a power failure, the pawl portion 96 of each clamp assembly will act to hold the wedge surfaces 62 in engagement with the wedge surfaces 92, 94 and thereby continue to hold the mold halves 20, 22 in position.

When it is necessary to disengage the mold halves 20, 22 from their respective platens 12, 14, the pneumatic cylinder 84 may be activated such that the plunger 86 is extended to engage and push the pawl portion 76 downwardly. The pneumatic cylinders 66, 68 may then be activated to force the slide member 50 of each clamp assembly 28 rearwardly and out of engagement with the clamp rings 88, 90. It should be noted that extension of the plunger 86 also forces the slide member 50 upwardly slightly relative to the clamp body 30 such that the surface contact between clamp plate wedge surfaces 62 and clamp ring wedge surfaces 92, 94 is broken to facilitate separation of the slide members from the clamp rings 88, 90.

It should be apparent that, in view of current press operating safety procedures, retraction of the cylinder pistons 70 and 72 must be controlled in such a manner that disengagement of the wedge surfaces 62 from the wedge surfaces 92, 94 will only occur when the upper and lower mold halves 20, 22 are in contact with each other. A safety feature of this nature may be incorporated into the operator interface controls for the press in a manner known to those skilled in the art of tire vulcanization presses.

Thus, the present invention provides clamping means by which mold halves may be quickly attached to and removed from their respective press platens. Further, the present invention provides clamping means for attaching a pair of mold halves to respective press platens within a vulcanization press whereby the need for plant personnel to come into close contact with the press is eliminated.

While the form of apparatus herein described constitutes a preferred embodiment of the invention, it is to be understood that the invention is not limited to this precise form of apparatus, and that changes may be made therein without departing from the scope of the invention which is defined in the appended claims.

What is claimed is:

1. In combination with a press having first and second mold halves movable away from and toward each other for receiving and enclosing an article therein, a clamp assembly for holding said mold halves to respective opposing portions of a press structure, said clamp assembly comprising:

a clamp body adapted to be mounted to said press adjacent to one of said opposing portions of said press structure;

mold clamp means for mounting to a mold half and including a wedge surface;

slide means supported for movement along said clamp body;

a wedge surface formed on said slide means;

means for locking said slide means in position relative to said clamp body when the wedge surfaces are in engagement with each other including a bar pivotally mounted within said clamp body and spring means for biasing said bar into position to engage with said slide means;

cylinder means for moving said slide means along said clamp body; and said wedge surface on said slide means being mounted for movement upon actuation of said cylinder to engage said wedge surface on said mold clamp means whereby said clamp assembly may hold said mold half in contact with one of said respective opposing portions of said press structure.

2. The combination of claim 1 including means for releasing said slide means from said locked position including a cylinder actuated plunger for pushing said bar away from said slide means.

3. The combination of claim 1 wherein said cylinder means includes a pneumatically actuated cylinder for moving said wedge surfaces into engagement with each other.

4. In combination with a press having upper and lower cooperating mold halves movable away from and toward each other, a clamp assembly for holding said mold halves to respective press platens, said clamp assembly comprising:

first engagement means for attachment to said press adjacent to a platen;

second engagement means for attachment to a mold half;

actuation means for moving one of said first and second engagement means into engagement with the other of said engagement means upon said actuation means being activated whereby said mold half is held in contact with said platen; and locking means for locking said first and second engagement means in engagement with each other upon deactivation of said actuation means.

5. The combination of claim 4 wherein said first and second engagement means include mutually engaging angled ramp surfaces.

6. The combination of claim 4 wherein said actuation means includes a pneumatically activated cylinder.

7. The combination of claim 6 wherein said first engagement means includes a clamp body and a slide means slidable on said clamp body and said pneumatically activated cylinder is connected to said slide means to move said slide means into engagement with said second engagement means.

8. The combination of claim 7 wherein said locking means includes a pawl pivotally mounted to said clamp body for engagement with said slide means to prevent movement of said slide means.

9. The combination of claim 8 further including a cylinder actuated plunger mounted on said slide means for disengaging said pawl from said slide means.

10. The combination of claim 7 wherein at least two of said first engagement means are provided spaced apart from each other for holding said mold half on said platen.

11. In combination with a vulcanization press for curing tires having upper and lower cooperating mold halves movable away from and toward each other for receiving and enclosing a tire therein, a clamp assembly for holding said mold halves to respective press platens, said clamp assembly comprising:

a clamp body including an elongated side guide having a top, a bottom for engaging a surface of a platen and supporting said clamp body and opposing sides connecting said top and bottom, and a cylinder support plate attached to an end of said slide guide and extending laterally outwardly beyond said opposing sides at a rear portion of said clamp body;

an elongated slot extending into said top of said slide guide along the length thereof;

a guide rail extending laterally from each of said opposing sides and spaced from said top and bottom of said slide guide along the length of said slide guide;

a clamp slide including laterally extending wing portions and a centrally located clamping plate connecting said wing portions, wherein said wing portions extend over said opposing sides and each wing portion includes a slot for receiving one of said guide rails whereby said clamp slide is supported for movement from said rear portion to a front portion of said clamp body;

a wedge surface formed in a lower front portion of said clamp plate wherein said wedge surface extends downwardly from said front portion to a rear portion of said clamp plate;

a lower lip portion located at and facing rearwardly from a lower rear portion of said clamp plate said lower lip portion defining a downwardly extending locking surface;

a locking bar positioned within said slot in said slide guide and having a rearwardly located upwardly extending pawl surface for engaging said locking surface on said lower lip portion of said camp plate when said clamp slide is located at a forward clamping position on said clamp body;

pin means for pivotally mounting said locking bar to a front portion of said slide guide;

spring means positioned between said locking bar and said slide guide slot for biasing said locking bar upwardly in pivotal movement about said pin means;

cylinder and plunger means mounted on a rearward portion of said clamp plate for pushing said locking bar downwardly against the force of said spring means to disengage said pawl surface on said locking bar from said locking surface on said lower lip portion of said clamp plate;

a pair of clamping cylinders attached to said cylinder support plate on either side of said slide guide, each clamping cylinder including a piston portion connected to one of said wing portions of said clamp slide whereby activation of said cylinders causes said camp slide to move forwardly to a forward position at which said locking surface on said clamp plate is located forwardly of said pawl surface on said locking bar and said spring means causes said locking bar to move upwardly such that said pawl and locking surfaces may engage with each other to prevent rearward movement of said clamp slide; and a mold clamp element for mounting to a mold half to be clamped to the platen surface supporting said clamp body, said mold clamp element being positioned over said front portion of said clamp body and having a wedge surface extending upwardly away from said clamp plate wherein, upon actuation of said clamping cylinders, said wedge surface on said clamp plate moves forwardly to engage said wedge surface on said mold clamp element and thereby hold an associated mold half in position on the platen surface.

* * * * *